No. 760,868. PATENTED MAY 24, 1904.
C. F. HUNTOON.
BRAKE BEAM.
APPLICATION FILED FEB. 27, 1904.
NO MODEL.
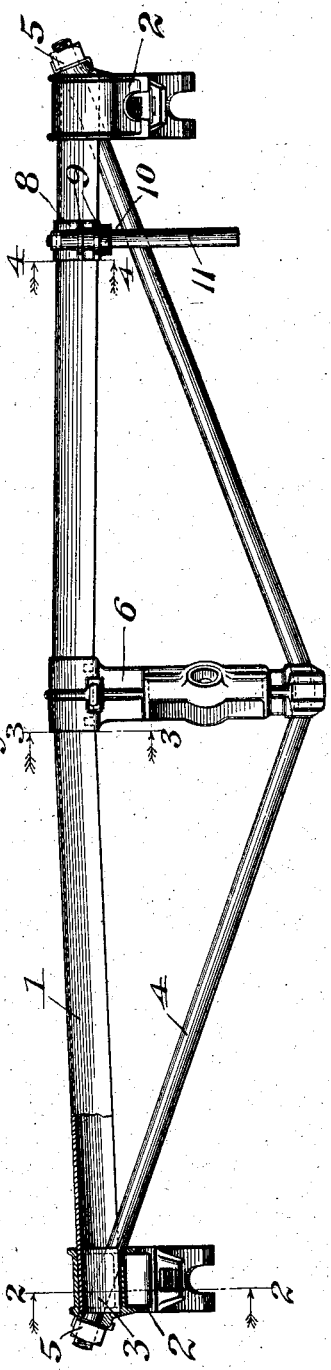
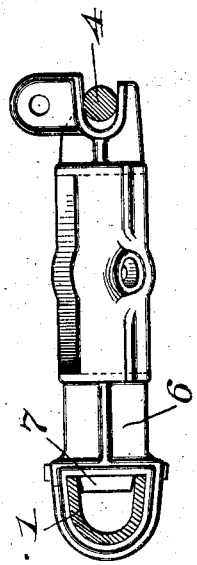
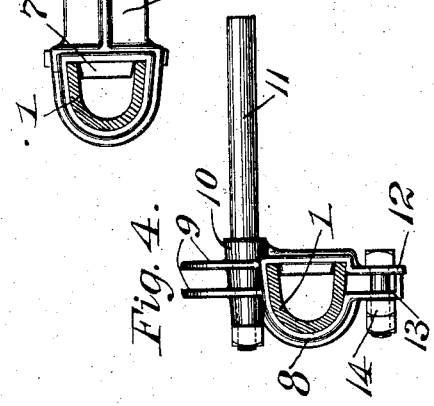
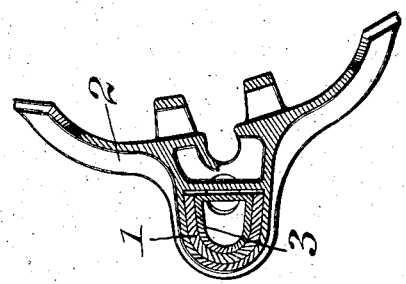
Witnesses:
Inventor:
Charles F. Huntoon,
by Bakewell Cornwall
Att'ys.

No. 760,868.

Patented May 24, 1904.

UNITED STATES PATENT OFFICE.

CHARLES F. HUNTOON, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

SPECIFICATION forming part of Letters Patent No. 760,868, dated May 24, 1904.

Application filed February 27, 1904. Serial No. 195,601. (No model.)

*To all whom it may concern:*

Be it known that I, CHARLES F. HUNTOON, a citizen of the United States, residing at Chicago, Cook county, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a plan view of my improved brake-beam. Fig. 2 is a sectional view on the line 2 2 of Fig. 1. Fig. 3 is a sectional view on the line 3 3 of Fig. 1, and Fig. 4 is a sectional view on the line 4 4 of Fig. 1.

This invention relates to a new and useful improvement in brake-beams, the object being to construct a brake-beam whose compression member is in the form of a channel having diverging legs or members, whereby the bulging stresses to which this member is subjected under load are counteracted by strains tending to preserve its original shape. Incidental to the use of a U-shaped compression member the strut or lever-post, finger-guard mounts, and brake-heads are so shaped as to accommodate themselves to the compression member in such a way as to preserve its shape and prevent distortion thereof. With these objects in view the invention consists in the construction, arrangement, and combination of the several parts, all as will be hereinafter described, and afterward pointed out in the claims.

In the drawings, 1 indicates the compression member, which is preferably made of commercially-rolled material and U-shaped in cross-section, the legs thereof slightly diverging for reasons hereinafter explained.

2 indicates the brake-heads, which are fitted on the ends of the compression member, said brake-heads being provided with appropriate openings for the tension-rod.

3 indicates filler-blocks, preferably made hollow, so as to fit within the ends of the channel, said filler-blocks being provided with openings for the passage of the ends of the tension-rod 4. This tension-rod is provided with nuts 5 at its ends, whereby the same may be tightened and a camber placed in the compression member.

6 is the strut or brake-lever post, whose outer end is provided with a seat for the tension-rod and in whose inner end is formed an eye so constructed as to take in the U-shaped compression member. This eye is provided with an internal lug 7, fitting between the legs of the compression member for spacing and holding said legs apart, while a wedge or key is driven down through an opening adjacent the eye, so as to bear against the legs and hold the strut in position against accidental displacement.

8 is the finger-guard clip, having lugs 9, between which the brake-hangers are secured, and a socket 10, in which the guard-finger 11 is secured. This clip is open at one side and is provided with a spacing-lug 12 for holding the legs of the compression member apart. The open side of the clip has an engaging lip 13 bearing against a companion flange, and between this lip and the compression member is introduced a clamping-bolt 14. By this construction the lip acts as a fulcrum for the flanges, and power being applied through the bolt will cause the clip to tightly hug the compression member, the said compression member being the resistance offered to the power applied through the bolt. Thus the securing-flanges act as levers of the second order, the fulcrum being at the extremity and the power applied between the fulcrum and the resistance.

The compression member of U shape is peculiarly adapted for brake-beams, its open side or channel readily accommodating the spacing-lugs and filler-block and taking in the ends of the tension member without necessitating an extra operation, as is the case where the compression member is made in the form of a tube. The diverging or flaring legs of the channel also lend themselves admirably to a trussed structure of the character described, for the reason that when a load is applied through the lever-post or strut, the reactions being at the brake-heads, the stresses set up in the compression member are such that instead of the buckling tendencies being exerted in a direction to bulge the flaring legs outwardly a counteracting stress is set up in the compression member of such a character as to neutralize this buckling tendency and because of its redundancy will set up a stress exerting a tendency to pull the flaring legs inwardly. To arrest this tendency, the spacing-blocks in the brake-heads and lugs or projections in the lever-post and finger-guard clips are utilized. It appears from tests made of the beam shown in the drawings that instead of taking the compression strains in a direct line, the U-shaped compression member acts like a plate-girder to this extent, that the edges of the flaring legs are placed in tension and produce a resultant force acting transversely and tending to move the legs inwardly toward each other. This stress not only neutralizes the outward buckling stresses, but dominates them to such an extent that the tests to destruction which have been made demonstrate that up to and considerable beyond the load usually applied in service the compression member preserves its original form, and in approaching the breaking limits the flaring legs of the compression member are placed under such tension that they exert a tendency to move toward each other until the load limit is reached, when a complete collapse of the compression member results. These tests demonstrate that the beam shown in the drawings is considerably stronger than actually required for service, so that the margin or factor of safety is far in excess of what is usually required or attained in actual practice.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a brake-beam, the combination with a U-shaped compression member having substantially straight flaring legs, a tension member, and a strut; substantially as described.

2. In a brake-beam, the combination with a strut and a tension member, of a U-shaped compression member having substantially straight flaring legs, and means for spacing the free ends of said legs apart; substantially as described.

3. In a brake-beam, the combination with a strut and a tension member, of a compression member having legs which project in the same general direction, said legs being connected together at one edge, said compression member under load setting up tension stresses in said legs to neutralize outward-bulging tendencies; substantially as described.

4. In a brake-beam, the combination with a tension member and a strut, of a cambered U-shaped compression member whose legs are substantially straight and made slightly flaring for the purposes described.

5. In a brake-beam, the combination with a tension member, a strut, a U-shaped compression member with its channel presented inwardly, and whose legs are substantially straight and made slightly flaring for the purposes described.

6. In a brake-beam, the combination of a strut, a tension member, a U-shaped compression member, a brake-head on the end of said compression member, and a filler-block inserted within the end of the compression member and having an opening through which the end of the tension member passes, the walls of the opening in the filler-block engaging the tension-rod to hold said filler-block in position; substantially as described.

7. In a brake-beam, the combination of a strut, a tension member, a U-shaped compression member, a filler-block for spacing apart the legs of the compression member, and having an opening through which filler-block the end of the tension member passes, the walls of the opening in the filler-block engaging the tension-rod to hold said filler-block in position, said tension member projecting beyond the brake-head and being threaded to receive a nut which impinges against the brake-head; substantially as described.

8. In a brake-beam, the combination of a U-shaped compression member whose legs are substantially straight and slightly flaring, and a strut or lever-post having shoulders for spacing and holding apart the legs of the compression member, and a key or wedge coöperating with said lever-post and compression member; substantially as described.

9. In a brake-beam, the combination of a U-shaped compression member, a finger-guard clip provided with shoulders for spacing and holding apart the legs of the compression member, and means for clamping said clip in position; substantially as described.

In testimony whereof I hereunto affix my signature, in the presence of two witnesses, this 23d day of February, 1904.

CHARLES F. HUNTOON.

Witnesses:
E. T. WALKER,
L. F. CALHOUN.